US010256860B2

(12) United States Patent
Chung

(10) Patent No.: US 10,256,860 B2
(45) Date of Patent: Apr. 9, 2019

(54) CARD STORAGE MOBILE PHONE CASE

(71) Applicant: ISPEAKER CO., LTD., Goyang-Si, Gyeonggi-Do (KR)

(72) Inventor: Young Suk Chung, Goyang-Si (KR)

(73) Assignee: ISPEAKER CO., LTD. (KR)

( * ) Notice: Subject to any disclaimer, the term of this patent is extended or adjusted under 35 U.S.C. 154(b) by 0 days.

(21) Appl. No.: 15/861,627

(22) Filed: Jan. 3, 2018

(65) Prior Publication Data
US 2018/0191395 A1   Jul. 5, 2018

(30) Foreign Application Priority Data
Jan. 3, 2017   (KR) .................. 20-2017-0000057 U

(51) Int. Cl.
H04B 1/38   (2015.01)
H04M 1/00   (2006.01)
(Continued)

(52) U.S. Cl.
CPC .......... *H04B 1/3888* (2013.01); *A45C 11/182* (2013.01); *A45C 2011/002* (2013.01)

(58) Field of Classification Search
CPC ... H04B 1/3833; H04B 1/3888; H04M 1/185; A45C 11/182; A45C 13/002;
(Continued)

(56) References Cited

U.S. PATENT DOCUMENTS 8,504,127 B2 *   8/2013   Altschul .............. H04B 1/3888
                                                    455/575.8
8,989,826 B1 *   3/2015   Connolly ................ A45C 1/06
                                                    455/90.3
(Continued)

FOREIGN PATENT DOCUMENTS

JP    H09200314 A      7/1997
KR    20130061531 A    6/2013
KR    101450311 B1    10/2014

*Primary Examiner* — Quochien B Vuong
(74) *Attorney, Agent, or Firm* — Renaissance IP Law Group LLP

(57) ABSTRACT

The present disclosure relates to a card storage mobile phone case including: a case main body including a front surface, on which a mobile phone storing part, in which attachment/detachment of a mobile phone is performed in a form of surrounding a rear surface and side surfaces of the mobile phone, is formed, and a rear surface which is provided with a card mounting part having a card mounting surface, and including a hinge structure in a lower portion of the rear surface; a main body cover fitted and coupled to the rear surface of the case main body in a state of surrounding the rear surface of the case main body, and including a card string region in which a bottom part of a front surface the main body cover is spaced a predetermined distance apart from a card mounting surface of the card mounding part of the case main body so as to store a card, and an opening which is provided on a lower portion of the main body cover and through which the card is stored and taken out; and an opening/closing cover including a hinge coupling part coupled to the hinge structure with the main body cover therebetween, and configured to open/close the opening.

7 Claims, 2 Drawing Sheets

(51) Int. Cl.
  *H04B 1/3888*   (2015.01)
  *A45C 11/18*    (2006.01)
  *A45C 11/00*    (2006.01)

(58) Field of Classification Search
  CPC ............ A45C 13/005; A45C 2011/002; A45C
        2011/003; A45C 2011/065; H01B 1/3816;
        H01B 1/3827; H01B 1/3833; H01B
        1/3888; H01B 2001/3861
  USPC .................................. 455/90.3, 575.1, 575.8
  See application file for complete search history.

(56) References Cited

U.S. PATENT DOCUMENTS

| | | | |
|---|---|---|---|
| 9,049,283 B1* | 6/2015 | Kim ..................... | H04M 1/21 |
| 9,936,780 B2* | 4/2018 | Tu ..................... | H04B 1/3888 |
| 2016/0113368 A1 | 4/2016 | Tu et al. | |
| 2017/0194997 A1* | 7/2017 | Tu ..................... | H04B 1/3888 |

* cited by examiner

CARD STORAGE MOBILE PHONE CASE

CROSS-REFERENCE TO RELATED APPLICATION

This application claims priority to Korean Utility Model Application No. 20-2017-0000057 filed on Jan. 3, 2017 and all the benefits accruing therefrom under 35 U.S.C. § 119, the contents of which are incorporated by reference in their entirety.

BACKGROUND

The present disclosure relates to a mobile phone case, and more particularly, to a mobile phone case provided with: a cover which is opened/closed by means of a structure on the rear side thereof; and a card storage part for storing various cards (such as a transportation card, a credit card, a check card, a discount card, a point card, etc.).

Recently, mobile phones are provided with wireless internet, high quality displays, high-resolution embedded cameras, touch screens, etc. and thereby form a high price. Accordingly, in order to protect a mobile phone from external shock applied due to carelessness of a user, various mobile phone cases are being used.

Meanwhile, the user of a mobile phone should carry, in addition to a mobile phone, a card wallet for carrying a transportation card, a credit card, a check card, a discount card, a point card, etc. or a separate wallet for storing various cards, cash, identification cards, etc. Therefore, when going out, the user experiences discomfort of separately carrying a mobile phone, a card wallet or a wallet Thus, development of a functional mobile phone case capable of storing cards and the like indispensably used in everyday life has been demanded.

SUMMARY

The present disclosure provides a mobile phone case having an opening/closing configuration in which a hinge member is applied so that user's card stored in the mobile phone case may be easily stored and taken out.

In accordance with an exemplary embodiment, a card storage mobile phone case including: a case main body including a mobile phone storing part on a front surface thereof, a card mounting part on a rear surface thereof, and a hinge structure on a lower portion of the rear surface thereof, wherein the mobile phone storing part has a shape surrounding a rear surface and side surfaces of a mobile phone so that a mobile phone is attached/detached; a main body cover including a card storing region fitted and coupled to the case main body while surrounding the rear surface of the case main body and configured to store the card such that a front bottom part of the main body cover is spaced a predetermined distance apart from a card mounting surface of the card mouning part of the case main body, and an opening provided on a lower portion thereof such that the card is stored and taken out therethrough; and an opening/closing cover including a hinge coupling part coupled to the hinge structure with the main body cover therebetween, and configured to open/close the opening.

The case main body may include: a camera hole formed in an upper portion thereof; functional key holes and functional key hole buttons along a side surface thereof; and a speaker hole and a charging hole in a lower surface thereof.

The case main body may include a recession part along a periphery of the rear surface thereof and may thereby be fitted and coupled to the main body cover.

The case main body may include a card storing part on a periphery of the card mounting part, wherein any one among the card storing guides positioned on a right or left side of the case main body may include a bent part having a lower height than the card storing part.

The main body cover may include: a camera hole formed in an upper portion thereof; and a protrusion part formed along a periphery of a rear surface thereof, and may be fitted and coupled into the recess part formed in the case main body.

The main body cover may include an elastic member provided on a front surface thereof, configured to bring the card, which is stored therein and taken out therefrom, into close contact with the rear surface of the case main body, and configured to fix and support the card.

The main body cover may include an opening/closing gap formed such that one side of the opening is formed lower than the other side so as to corresponding to the bent part of the case main body.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
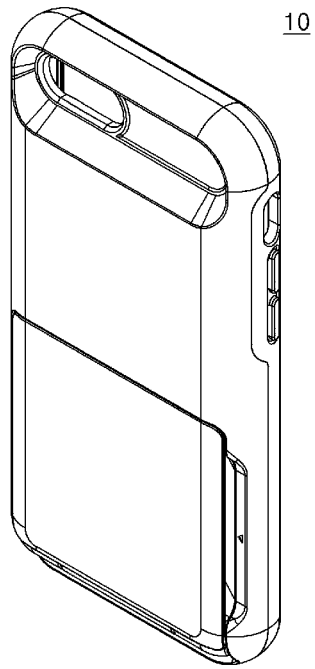
FIG. 1 is a perspective view of a mobile phone case in accordance with an exemplary embodiment.

Hereinafter, embodiments of the present disclosure will be described in detail with reference to the accompanying drawings so that the present disclosure may easily be carried out by a person of ordinary skill in the art to which the disclosure pertains. The present disclosure may, however, be embodied in different forms and should not be construed as limited to the embodiments set forth herein. In the drawings, anything unnecessary for describing the present disclosure will be omitted for clarity, and also like reference numerals in the drawings denote like elements.

Although the terms such as "first" and "second" are used herein to describe various elements, these elements should not be limited by these terms. The terms are only used to distinguish one component from other components. For example, without departing from the scope of the present disclosure, a first component may be referred to as a second component, and similarly, the second component may also be referred to as the first component. The terms used in the present disclosure are used only for explaining a specific exemplary embodiment while not limiting the present disclosure. The terms of a singular form may include plural forms unless referred to the contrary.

In this specification, when one part is referred to as being "connected" to another part, it should be understood that the former can be "directly connected" to the latter, or "electrically connected" to the latter via an intervening part. Furthermore, when it is described that one part "includes" some components, it does not mean that other components are excluded but means that other elements may be further included if there is no specific contrary indication. The terms "step of (performing)" or "step of" used in the entire specification of the present disclosure does not mean "step for".

Terms used in the present disclosure is selected as general terms as widely used as possible while considering functions in the present disclosure, but these may be changed according to intent of a person skilled in the art, a precedent, an advent of new technique, or the like. In addition, in a specific case, there are terms arbitrarily selected by applicants, and in this case, the meaning of the terms will be described in detail in the corresponding description part of the present disclosure. Accordingly, the terms used in the present disclosure should be defined on the basis of the meanings the terms have and the contents of the entirety of the present disclosure rather than defined by simple names of the terms.

Figure 2:
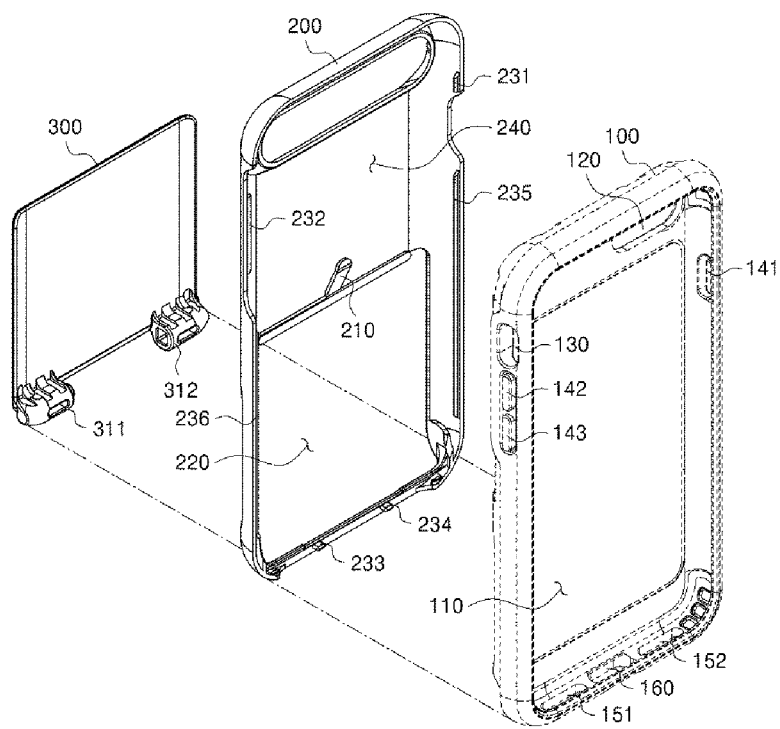
FIG. 2 is a perspective view of a mobile phone case in accordance with an exemplary embodiment when the mobile phone case is viewed in a direction of storing a mobile phone.
Figure 3:
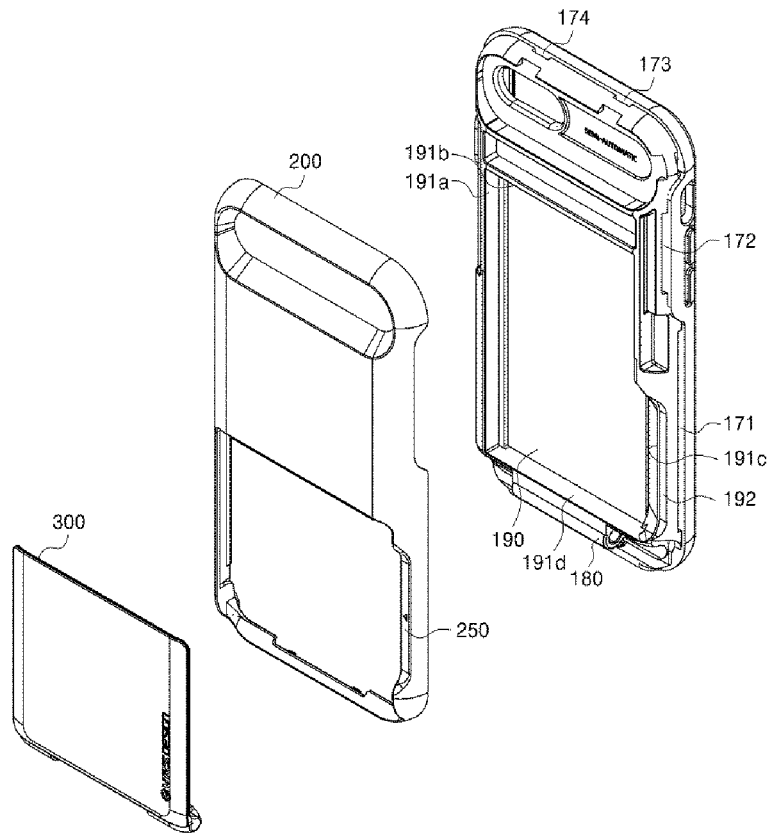
FIG. 3 is a perspective view of a mobile phone case in accordance with an exemplary embodiment when the mobile phone case is viewed in a direction of storing a card.
Figure 4:
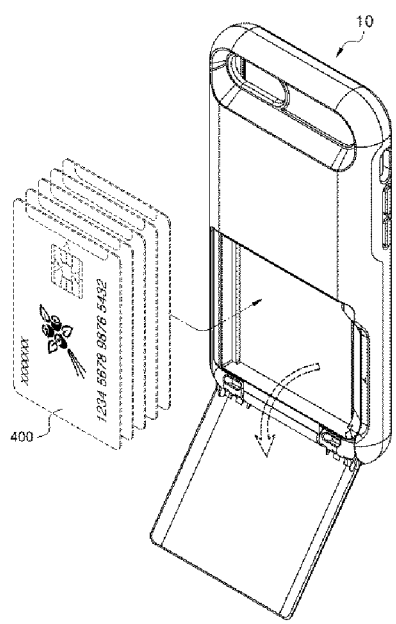
FIG. 4 is a perspective view illustrating a method of storing a card in a mobile phone case in accordance with an exemplary embodiment.

Hereinafter with reference to FIGS. 1 to 4 attached, preferred embodiments of the present disclosure will be described in detail As illustrated, a mobile phone case 10 according to the present disclosure includes: a case main body 100 having a mobile phone storing part 110 formed on a front surface thereof; a main body cover 200 coupled to the rear surface of the case main body and having an opening; and an opening/closing cover 300 capable of opening/closing the opening 220. The "front surfaces" and the "rear surfaces" of the mobile phone case 10, the case main body 100, and the main body cover 200 are referred to as such that surfaces onto which the mobile phone is mounted are referred to as "front surfaces", and surfaces opposite to the "front surfaces" are referred to as "rear surfaces".

First, the case main body 100 has, on the front surface thereof, the mobile phone storing part 110 in which a mobile phone is stored, and may be manufactured in a shape surrounding a portion of the rear surface and the side surfaces of the mobile phone so that the mobile phone is attached/detached.

In addition, in a side surface of the case main body 100, a function key hole 130 and function key buttons 141, 142, and 143 which correspond to function keys of the mobile phone are formed, and thus, even when the mobile phone is stored in the case main body 100, the function keys may be easily operated.

In addition, in the lower surface of the case main body 100, speaker holes 151 and 152, which correspond to a microphone, an earphone terminal, and a speaker of the mobile phone, and a charging hole 160 corresponding to a charging terminal are formed.

In the rear surface of the case main body 100, card storage guides 191a, 191b, 191c, and 191d for storing a card 400 and a card mounting part 190 formed by the card storage guides are formed, and thus, the card 400 is stored into and mounted on the card mounting part 190. In addition, the positional change of the stored card may be prevented by the card storage guides 191a, 191b, 191c, and 191d.

In addition, any one of the card storage guides formed in the left or right side of the case main body 100 forms a bent part 192 formed to be lower than the level of the card storage guide facing the any one of the card storage guide. This is a configuration for forming an opening/closing gap 250 to be described below.

In addition, in the upper portion of the case main body 100, a camera hole is formed such that when a mobile phone camera is used, the camera is prevented from being occluded by the case.

In addition, in the rear surface of the case main body, a plurality of recess parts 171, 172, 173, and 174 are formed along the periphery thereof, and thus, the main body cover 200 may be attached/detached by fitting coupling.

In a rear lower portion of the case main body 100, a hinge structure 180, which is mounted so that the opening/closing cover can be opened/closed by means of a hinge member (not shown), is formed. The opening/closing cover 300 is configured to be easily opened/closed by means of the hinge structure. As the hinge structure 180, a typical hinge structure well-known on the filing date of the present disclosure is used.

The main body cover 200 is configured to be coupled to the rear surface of the case main body 100.

In addition, the main body cover 200 forms a side surface having a region coupled to the rear surface of the case main body 100.

The main body cover 200 has, on the inner side of the side surface thereof, a plurality of protrusion parts 231, 232, 233, 234, 235, and 236 corresponding to the plurality of recess parts 171, 172, 173, and 174, so that the protrusion parts 231, 232, 233, 234, 235, and 236 are coupled to the recess parts 171, 172, 173, and 174 and the main body cover 200 is thereby fitted and coupled in a form of surrounding the rear surface of the case main body 100.

In addition, the main body cover 200 is spaced a predetermined distance apart from the card mounting part 190 of the case main body 100 and thus forms a space in which one or more cards 400 may be stored. That is, when the main body cover 200 is coupled to the case main body 100, the card mounting part 190 and a front bottom part 240 of the main body cover 200 form a card storing region which is a space in which the card storage guides 191a, 191b, and 191c may be received.

Accordingly, when the card 400 is stored in the card mounting part 190, the front bottom part 240 of the main body cover 200 and the storing guides 191a, 191b, 191c, 191d prevents the card 400 from being detached.

In addition, the opening 220 is formed in a lower portion of the main body cover 200 and is configured such that the card can be stored into and taken out of the card mounting part 190 through the opening 220.

In addition, an elastic member 210 is formed on a central portion on the side of the opening 220 of the front surface bottom part 240 of the main body cover 200, and thus, the elastic member 210 functions to support and fix the card 400 such that the card 400 and a card mounting surface of the card mounting part 190 are brought into close contact with each other when the card is stored in the card mounting part 190. The card mounting surface is a rear bottom surface of the case main body 100 which forms the card mounting part 190.

The elastic member 210 is formed to have an inclination in the direction of storing the card and may be configured into a form to prevent a jam when the card is stored.

The main body cover 200 has an opening/closing gap 250 which is formed corresponding to the bent part 192 of the case main body 10 such that one side of the opening 220 is lower than the other side, and thus, the opening/closing cover 300 may be easily operated.

The opening/closing cover 300 is configured to have hinge coupling parts 311 and 312 formed on both sides of lower end portion thereof to thereby support the hinge member (not shown) attached to the case main body 100.

In addition, the hinge member, which has elasticity, allows the operation of the opening/closing cover 300 to be maintained while the opening/closing cover 300 is opened or closed, and thus allows a mobile phone user to easily store and take out the card 400.

As such, according to the present disclosure, the main body cover 200 coupled to the rear surface of the case main body 100 and the opening/closing cover 300 operated by the hinge member are provided, and the card storing space is formed between the case main body 100 and the main body cover 200, so that one to five cards may be quickly stored and taken out by means of a simple operational configuration which opens/closes the opening/closing cover 300, and thus, the present disclosure has an effect of further improving the convenience in using cards.

As described above, according to the present disclosure, a case cover coupled to a rear surface of a case main body while surrounding and protecting the outer periphery and the rear surface of a mobile phone and an opening/closing cover operated by a hinge structure are provided, and a card storing space is formed between the case main body and the case cover, so that one or more cards may quickly be stored and taken out from a simple operating structure for opening/closing the opening/closing cover, and thus, the present disclosure has an effect of improving the convenience in using the cards.

In addition, the present disclosure has an effect of preventing scratches etc. which may be caused on the rear surface of the mobile phone while storing and taking out the cards.

Although the card storage mobile phone case has been described with reference to the specific embodiments, it is not limited thereto. Therefore, it will be readily understood by those skilled in the art that various modifications and changes can be made thereto without departing from the spirit and scope of the present disclosure defined by the appended claims.

DESCRIPTION OF THE REFERENCE SYMBOLS

10: Mobile phone case
100: Case main body
110: Mobile phone storing part
120: Camera hole
130: Functional key hole
141, 142, 143: Functional key buttons
151, 152: Speaker holes
160: Charging hole
171, 172, 173, 174: Recess parts
180: Hinge structure
190: Card mounting part
191a, 191b, 191c, 191d: Card storing guides
200: Main body cover
210: Elastic member
220: Opening
231, 232, 233, 234, 235, 236: Protrusion parts
240: Front bottom part
250: Opening/closing gap
300: Opening/closing cover
311, 312: Hinge coupling parts

What is claimed is:

1. A card storage mobile phone case comprising:
   a case main body comprising a mobile phone storing part on a front surface thereof, a card mounting part on a rear surface thereof, and a hinge structure on a lower portion of the rear surface thereof, wherein the mobile phone storing part has a shape surrounding a rear surface and side surfaces of a mobile phone so that a mobile phone is attached/detached;
   a main body cover comprising
      a card storing region fitted and coupled to the case main body while surrounding the rear surface of the case main body and configured to store the card such that a front bottom part of the main body cover is spaced a predetermined distance apart from a card mounting surface of the card mounting part of the case main body, and
      an opening provided on a lower portion thereof such that the card is stored and taken out therethrough; and
   an opening/closing cover comprising a hinge coupling part coupled to the hinge structure with the main body cover therebetween and configured to open/close the opening,
   wherein the case main body comprises a card storing part on a periphery of the card mounting part, and any one among the card storing guides positioned on a right or left side of the case main body comprises a bent part having a lower height than the card storing part, and
   the main body cover comprises an elastic member provided on a front surface thereof, configured to bring the card, which is stored therein and taken out therefrom, into close contact with the rear surface of the case main body, and configured to fix and support the card.

2. The card storage mobile phone case of claim 1, wherein the case main body comprising:
   a camera hole formed in an upper portion thereof;
   functional key holes and functional key hole buttons along a side surface thereof; and
   a speaker hole and a charging hole in a lower surface thereof.

3. The card storage mobile phone case of claim 1, wherein the case main body comprises a recess part along a periphery of the rear surface thereof and is thereby fitted and coupled to the main body cover.

4. The card storage mobile phone case of claim 3, wherein the main body cover comprises:
   a camera hole formed in an upper portion thereof; and
   a protrusion part formed along a periphery of a rear surface thereof, and is fitted and coupled into the recess part formed in the case main body.

5. The card storage mobile phone case of claim 1, wherein the main body cover comprises an opening/closing gap formed such that one side of the opening is formed lower than the other side so as to corresponding to the bent part of the case main body.

6. A card storage mobile phone case comprising:
   a case main body comprising a mobile phone storing part on a front surface thereof, a card mounting part on a rear surface thereof, and a hinge structure on a lower portion of the rear surface thereof, wherein the mobile phone storing part has a shape surrounding a rear surface and side surfaces of a mobile phone so that a mobile phone is attached/detached;
   a main body cover comprising
      a card storing region fitted and coupled to the case main body while surrounding the rear surface of the case main body and configured to store the card such that a front bottom part of the main body cover is spaced a predetermined distance apart from a card mounting surface of the card mounding part of the case main body, and an opening provided on a lower portion thereof such that the card is stored and taken out therethrough; and an opening/closing cover comprising a hinge coupling part coupled to the hinge structure with the main body cover therebetween and configured to open/close the opening, wherein the case main body comprises a card storing part on a periphery of the card mounting part, and any one among the card storing guides positioned on a right or left side of the case main body comprises a bent part having a lower height than the card storing part.

7. A card storage mobile phone case comprising:

a case main body comprising a mobile phone storing part on a front surface thereof, a card mounting part on a rear surface thereof, and a hinge structure on a lower portion of the rear surface thereof, wherein the mobile phone storing part has a shape surrounding a rear surface and side surfaces of a mobile phone so that a mobile phone is attached/detached;

a main body cover comprising a card storing region fitted and coupled to the case main body while surrounding the rear surface of the case main body and configured to store the card such that a front bottom part of the main body cover is spaced a predetermined distance apart from a card mounting surface of the card mounding part of the case main body, and an opening provided on a lower portion thereof such that the card is stored and taken out therethrough; and an opening/closing cover comprising a hinge coupling part coupled to the hinge structure with the main body cover therebetween and configured to open/close the opening, wherein the main body cover comprises an elastic member provided on a front surface thereof, configured to bring the card, which is stored therein and taken out therefrom, into close contact with the rear surface of the case main body, and configured to fix and support the card.

* * * * *